(Model.)

W. W. LOUIS.
Cotton, Hay and Tobacco Press.

No. 238,511. Patented March 8, 1881.

Witnesses:
W. F. Carter
J. M. Clark

Inventor:
Wm W. Louis
his mark

UNITED STATES PATENT OFFICE.

WILLIAM W. LOUIS, OF PARIS, TENNESSEE, ASSIGNOR OF TWO-THIRDS TO PETER LOONEY AND LON LOONEY, OF SAME PLACE.

COTTON, HAY, AND TOBACCO PRESS.

SPECIFICATION forming part of Letters Patent No. 238,511, dated March 8, 1881.

Application filed June 26, 1880. (Model.)

*To all whom it may concern:*

Be it known that I, WILLIAM W. LOUIS, of Paris, in the county of Henry and State of Tennessee, have invented a new and valuable Improvement in Cotton, Hay, and Tobacco Presses; and I do hereby declare that the following is a full, clear, and exact description of the construction and operation of the same, reference being had to the accompanying drawings, making a part of this specification, and to the letters and figures marked thereon.

Figure 2:
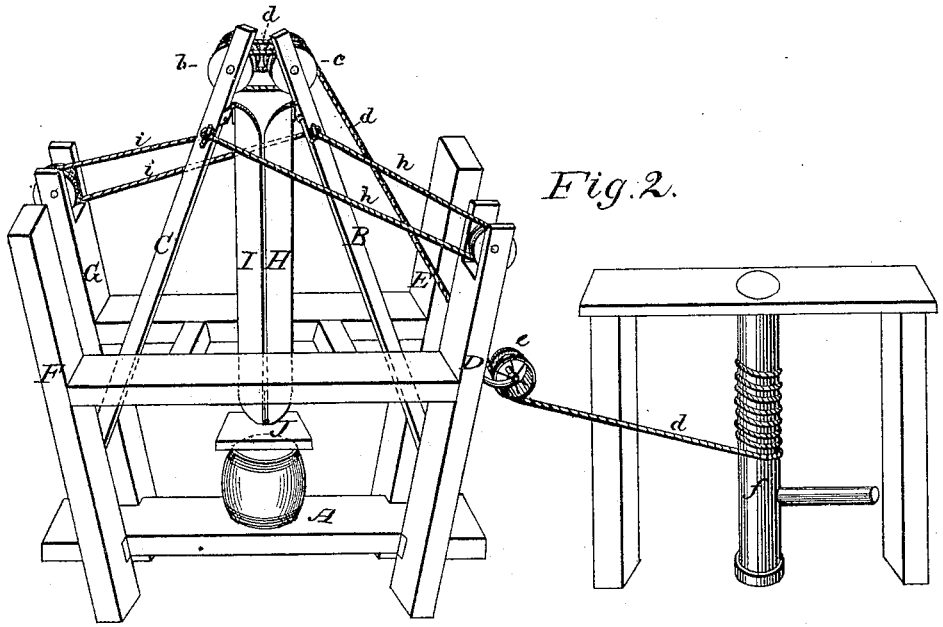
Figure 1:
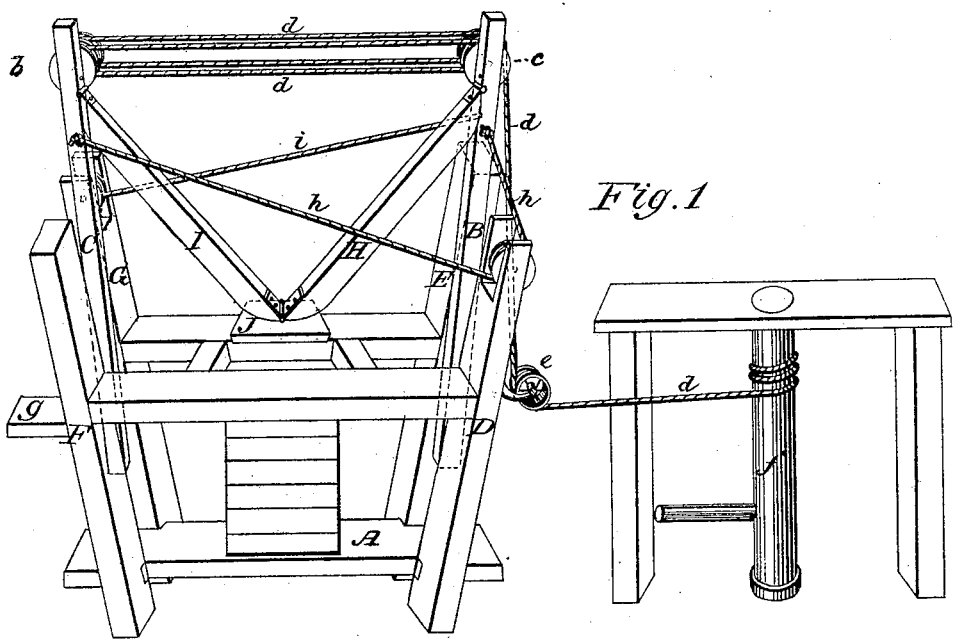

Figures 1 and 2 of the drawings are representations of side views of my press, Fig. 1 showing the press with cotton or hay box ready to be filled, Fig. 2 showing the tobacco-hogshead.

This invention has relation to cotton, hay, and tobacco presses of the upright kind, wherein two lever-arms, having hinged to them two other lever-arms, to the lower end of which is attached a follower, are drawn inward by a system of pulleys to depress the said follower; and the novelty of this consists in two stay-cords attached to both main lever-arms, and passing around a pulley on two of the upright frame-pieces, whereby the system of pulleys and levers are made to retain their proper positions in elevating and depressing the follower. A second novelty consists in the lever-arm made fast to one of the upright levers, by means of which the follower is raised, all of which will be hereinafter more fully set forth and explained.

In the drawings, A designates the ground-sill of press-frame, which is preferably sunk into the ground even with the surface of the soil, and upon which the press-box or tobacco-hogshead is mounted, and to which they may be rigidly secured.

B and C designate similar actuating-levers hinged to the four upright frame-pieces designated by D E F G.

Letters H and I designate two other similar actuating lever-arms hinged to the upright levers B and C, and to the ends of which is hinged a follower, J.

b and c designate two double pulleys attached to the upper ends of levers B and C.

Letter d designates a cable, one end of which is made fast to one of the levers, B, and passing over the system of pulleys b and c, thence under the pulley e, thence to a winding-drum, f, operated by any suitable motive power.

Letter g designates a lever made fast to the lower end of lever-arm C, to the end of which is attached a weight, (not represented in the drawings,) the object of which is to raise the follower J.

The press-box having been filled, or the hogshead placed in position, the follower, being in proper position, is made to descend into the press-box or hogshead by causing the drum to be actuated. This action draws the top of levers B and C, also the top of levers H and I, inward, thereby causing them to assume constantly a nearer perpendicular position, thus giving great increase of power.

In pressing hay or cotton, after a bale is completed and turned out and the follower raised, the follower is moved to one side, as shown in Fig. 1, for the purpose of recharging with the substance to be pressed.

The advantage gained by the side cables I will now explain. These two cables, b and i, enable me to obtain downward pressure instead of upward pressure, it requiring less pressure to force down than up; consequently from the same motor and from a press of the same size I obtain a greatly-increased compressing power and reduce to a smaller compass the substance to be pressed.

What I claim as new, and desire to secure by Letters Patent, is—

1. The side cables, h and i, attached to levers B and C, said cables serving as steadying devices for the system of levers.

2. The lever-arm g, attached to arm C, by the operation of which, and by attachment of a weight on outward end of arm g, the press is made to assume position for a recharge of press-box with substance to be pressed.

In testimony that I claim the above I have hereunto subscribed my name in the presence of two witnesses.

WILLIAM WINSTON $\overset{\text{his}}{\times}$ LOUIS.
<br>                                        mark.

Witnesses:
  J. W. DOUGLASS,
  A. B. LAMB.